March 4, 1952
E. W. HOLMES
2,588,004
CONTROL MEANS FOR HYDRAULICALLY
OPERATED WEED AND BRUSH CUTTERS
Filed June 25, 1948
6 Sheets-Sheet 1
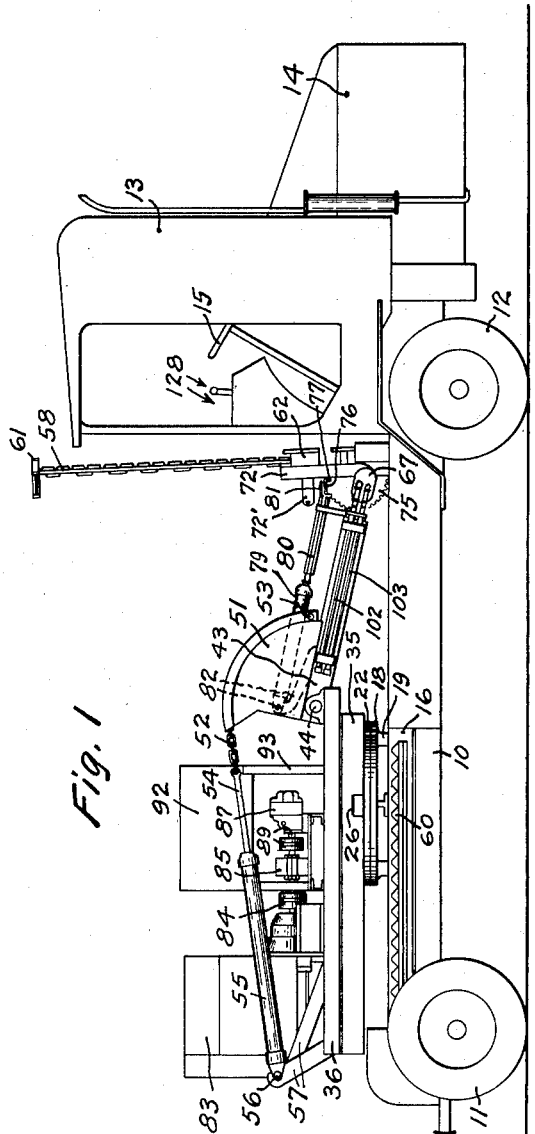
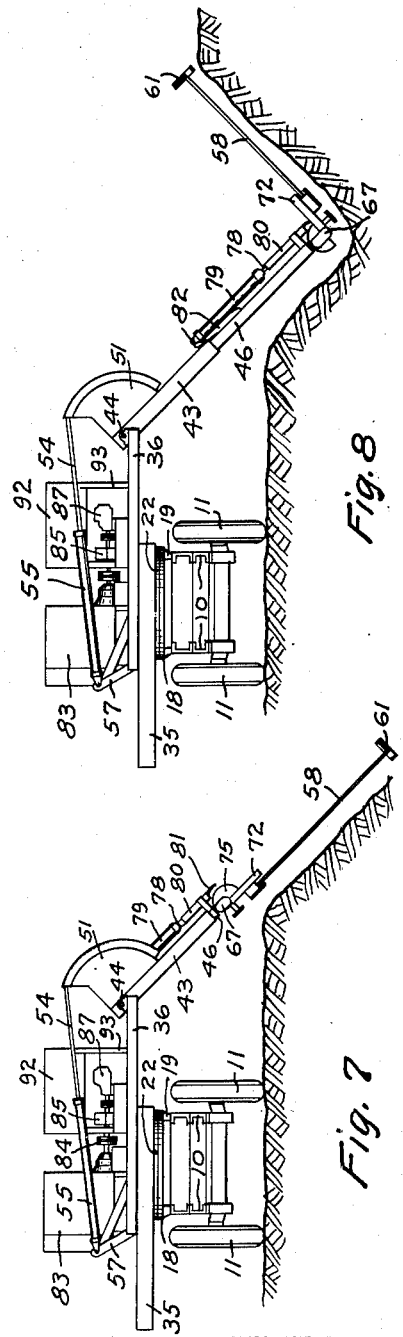
INVENTOR.
Earl W. Holmes
BY
Fred C. Matheny
ATTORNEY.

INVENTOR.
Earl W. Holmes
BY
Fred C. Matheny
ATTORNEY

INVENTOR.
Earl W. Holmes
BY
Fred C. Matheny
ATTORNEY

March 4, 1952

E. W. HOLMES 2,588,004

CONTROL MEANS FOR HYDRAULICALLY
OPERATED WEED AND BRUSH CUTTERS

Filed June 25, 1948

INVENTOR.
Earl W. Holmes
BY
Fred C. Matheny
ATTORNEY

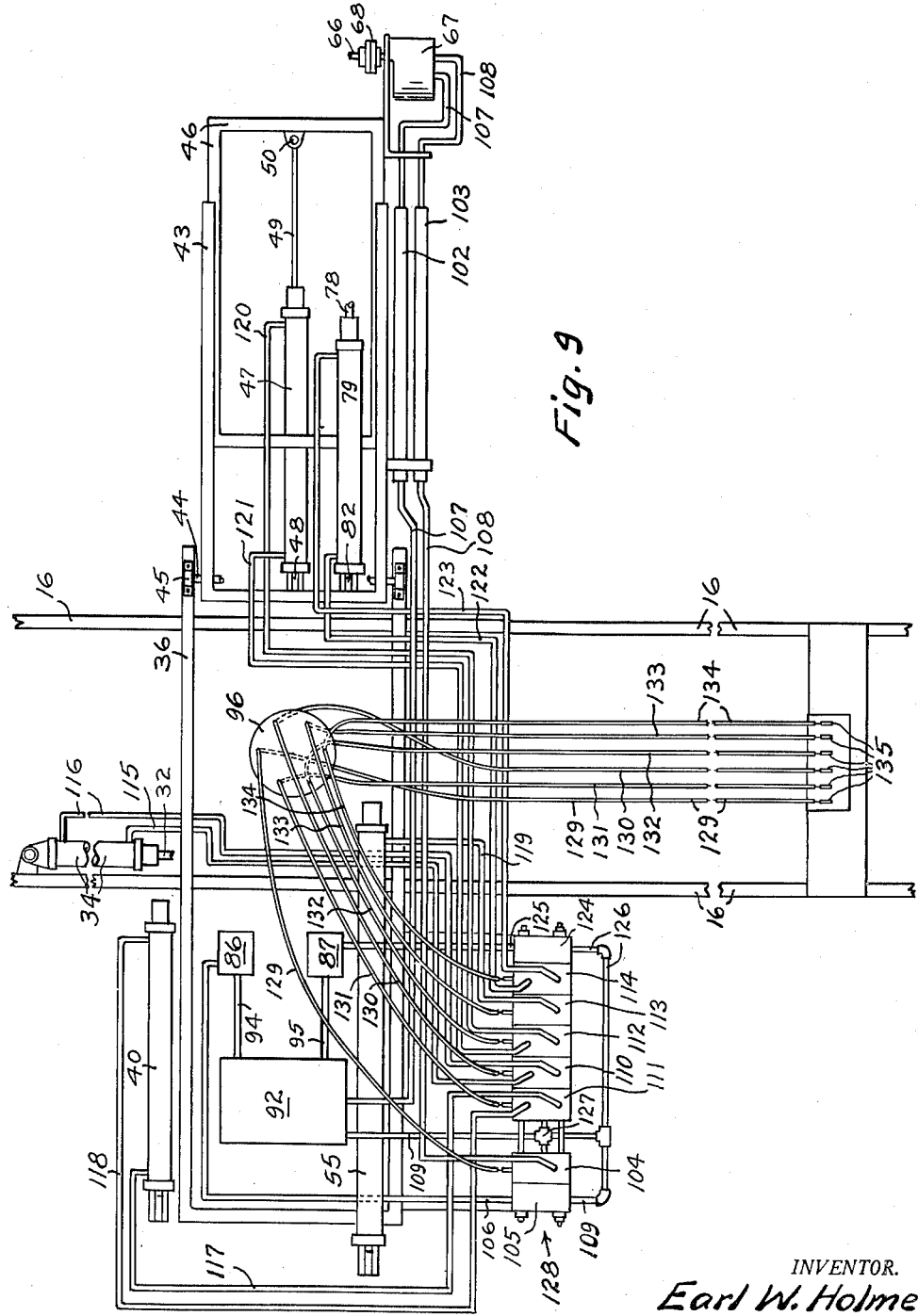

Patented Mar. 4, 1952

2,588,004

UNITED STATES PATENT OFFICE 2,588,004

CONTROL MEANS FOR HYDRAULICALLY OPERATED WEED AND BRUSH CUTTERS

Earl W. Holmes, Burlington, Wash.

Application June 25, 1948, Serial No. 35,163

7 Claims. (Cl. 56—25)

This invention relates to mechanical mowing equipment in general, and particularly to improvements in control means for a hydraulically operated mobile weed and brush cutter.

It is an object of my present invention to provide a machine of this type which can be operated by one person.

Mobile weed and brush cutters of the type adapted for cutting weeds and brush alongside of highways and the like essentially require heavy duty cutter mechanism mounted on automotive truck means which is capable of traveling at relatively high speed when moving from place to place. Machines of this type ordinarily require the services of two operators, one to drive and control the truck and one to control the cutter mechanism. In accordance with the present invention I have arranged the truck driving and control means and the cutter mechanism control means so that one operator can control all of this mechanism without substantially reducing the efficiency of the machine.

Another object of my invention is to provide a mobile weed and brush cutter in which cutter mechanism is positioned toward the forward end of an automotive truck and in which control means for the cutter mechanism and control and steering means for the truck are all positioned toward the rear end of the truck so that one operator positioned toward the rear end of the truck can control the cutter mechanism and at the same time can steer and control the truck.

Another object of my invention is to provide a mobile weed and brush cutter in which swingingly mounted adjustable cutter mechanism is supported on an automotive truck and in which one-man control means for both the truck and the cutter mechanism are positioned on the truck to the rear of the cutter mechanism so that the one operator and driver, who controls both the truck and the cutter mechanism, will have the best possible visibility of the cutter mechanism at all times.

Other objects are to provide one-man control means of simple and efficient construction for a mobile weed and brush cutter in which hydraulically operated cutter mechanism is carried on an automotive truck.

Another object is to provide a mobile weed and brush cutter in which swingingly mounted hydraulically operated cutter mechanism is supported by turntable means on an automotive truck and in which both steering and control means for the truck and control valves for the cutter mechanism are positioned on the truck to the rear of the cutter mechanism and in which a plurality of hydraulic conduits extending between the control valves on the truck frame and the hydraulic operating devices on the cutter mechanism are passed through the center or hub portion of the turntable means.

Other objects of the invention will be apparent from the following description taken in connection with the accompanying drawings.

In the drawings Figure 1 is a side elevation of a mobile weed and brush cutter constructed in accordance with this invention showing the cutter mechanism is an inoperative position in which it would be placed when the device is to be moved from place to place.

Fig. 7 is a somewhat diagrammatic view in elevation with parts in section, looking in the direction of broken line 7-7 of Fig. 2 and illustrating one adjustment of the cutter sickle for cutting weeds and brush on a slope alongside of a highway.

Fig. 8 is a view similar to Fig. 7 showing a different adjustment of the sickle mechanism to meet the requirements of roadside terrain of different contour.

Fig. 9 is a diagram similar to Fig. 3 but showing the control valves mounted on the turntable and showing push-pull cables extending from these valves to the cab of the truck.

Like reference numerals designate like parts throughout the several views.

*Truck*

Figure 2:
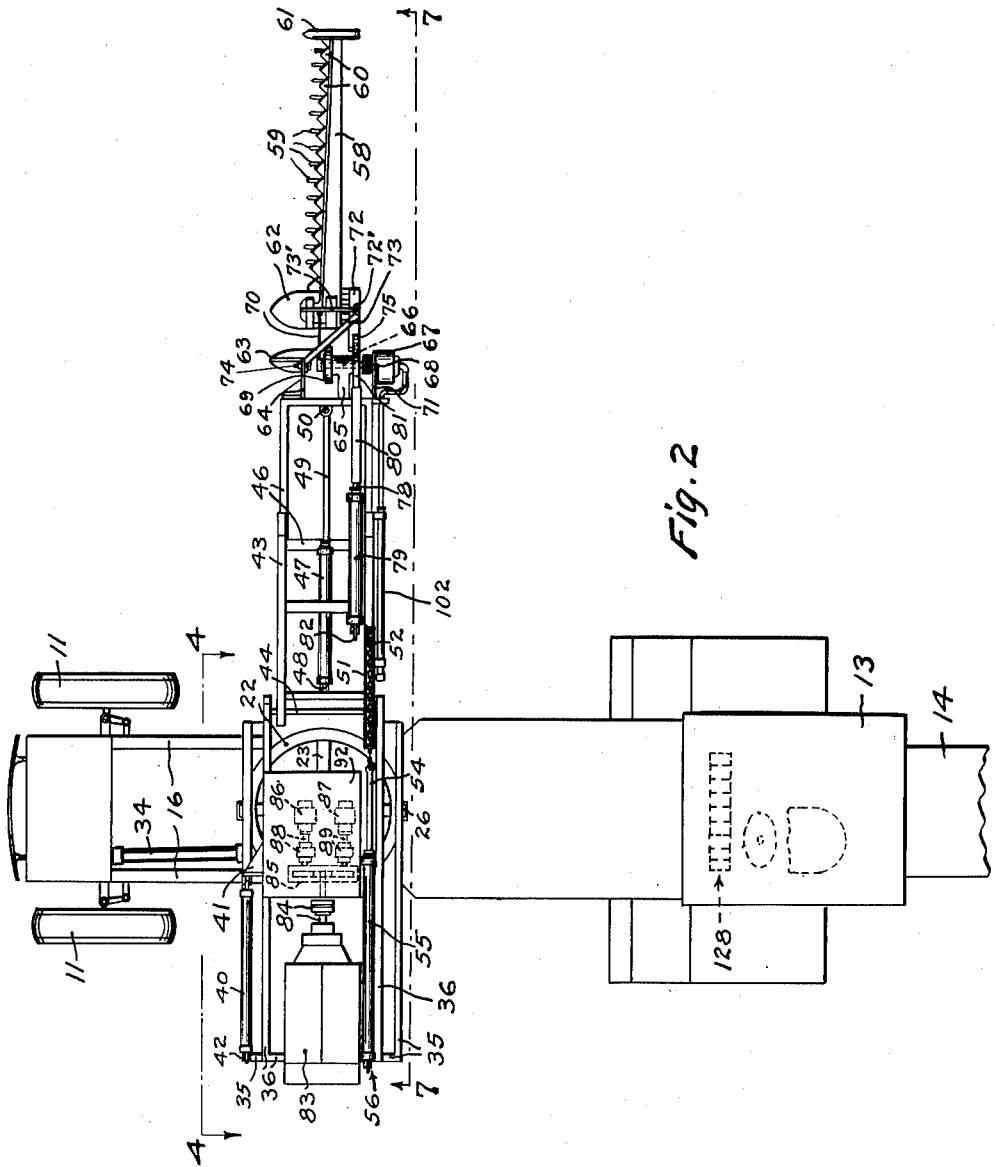
Fig. 2 is a plan view of this device showing the cutter mechanism positioned crosswise of the truck frame as it would be for normal cutting operation and showing an adjustable support frame and a cutter sickle in an extended horizontal position.

In accordance with this invention an automotive truck of special construction is provided as a mobile carrier on which this weed and brush cutter is mounted. This truck comprises a frame 10, front wheels 11, rear wheels 12 and a cab 13 positioned on the rear end portion of the truck. The motor for driving the truck is disposed within suitable motor housing means 14 which is positioned to the rear of the rear truck wheels 12 and to the rear of the cab 13. Driving means of any suitable form can be used to connect the motor to wheels of the truck and any suitable control means can be provided for the motor. A steering wheel 15 in the cab 13 has suitable connections preferably with the front wheels 11 of the truck so that the operator in the cab can steer the truck. The motor control means and the driving connections between the motor and truck wheels and the steering means can be of conventional construction and as these are well known in the art they are not herein shown or described in detail.

*Frame structure of weed and brush cutter*

In a general way this weed and brush cutting mechanism comprises a foundation frame composed of two spaced apart side channels 16 connected by cross members 17. This foundation frame 16—17 is removably secured to the truck frame with the side channels 16 preferably resting on the longitudinal channels of the truck frame 10. This provides a structure in which the weed and brush cutter, as a unit, can be quickly and easily transferred from one truck to another and can be removed from the truck to facilitate servicing.

Figure 4:
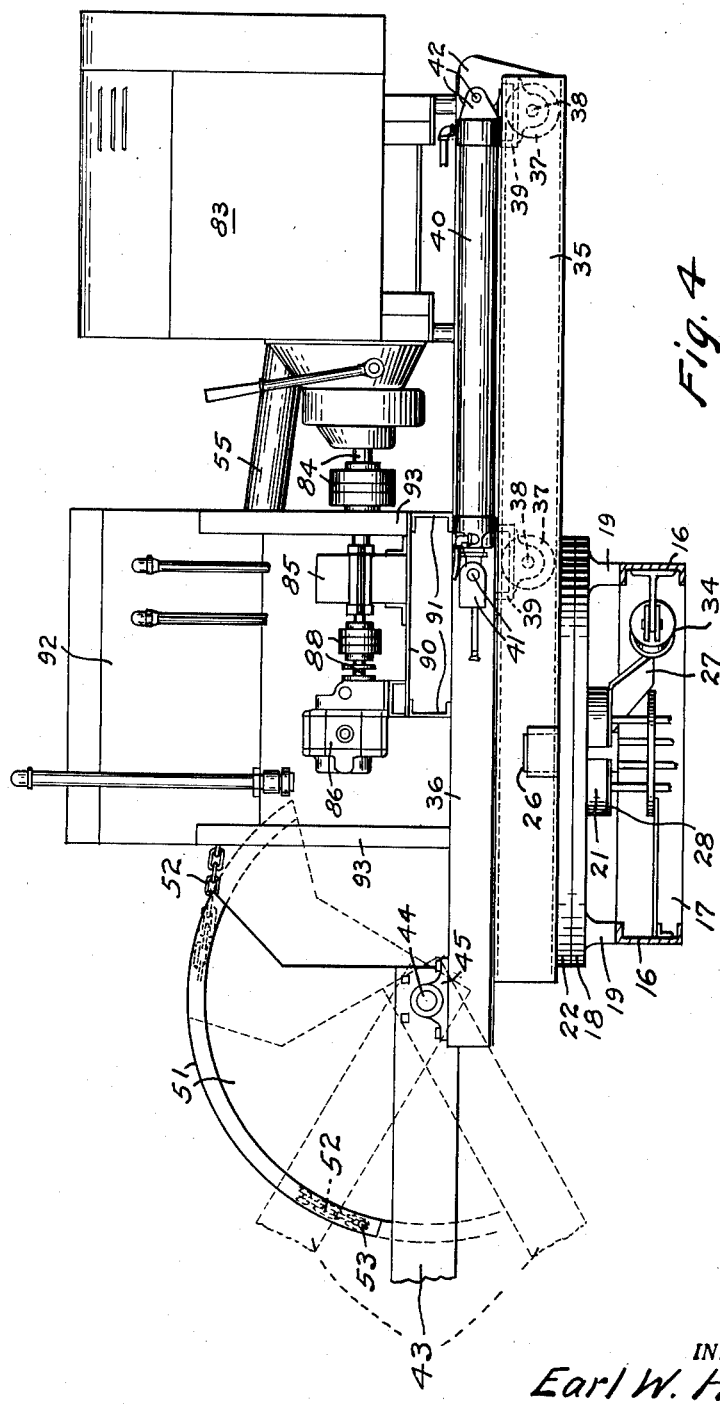
Fig. 4 is a view partly in elevation and partly in section taken substantially on broken line 4—4 of Fig. 2 and on a larger scale than Fig. 2 and showing parts of the power plant, turntable, turntable frame, sickle bar supporting and adjusting means and foundation frame.
Figure 5:
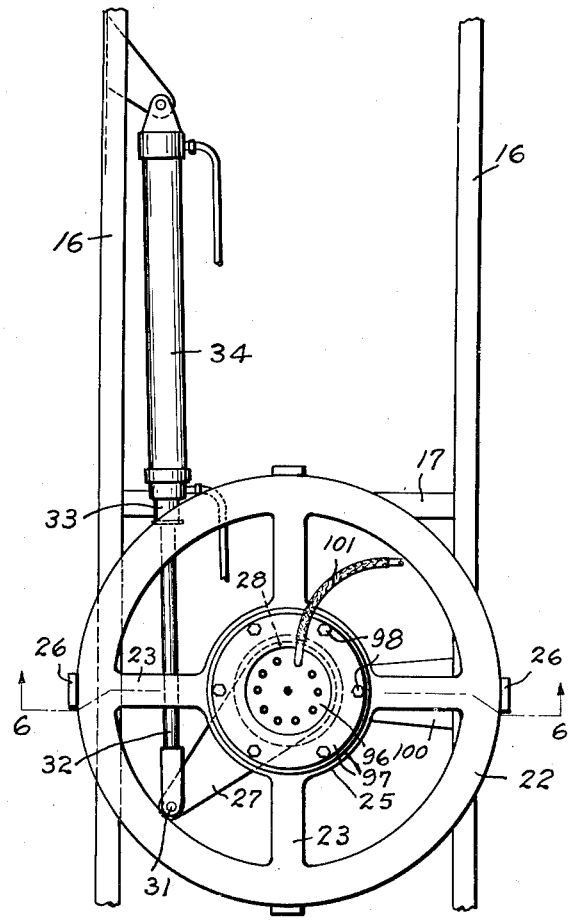
Fig. 5 is a fragmentary detached plan view showing parts of the turntable mechanism.
Figure 6:
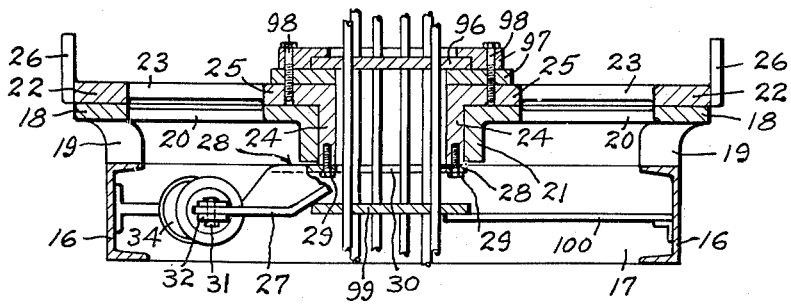
Fig. 6 is a sectional view taken substantially on broken line 6-6 of Fig. 5.

The weed and brush cutter mechanism as a whole is mounted on its foundation frame 16—17 by turntable means best shown in Figs. 4, 5 and 6. This turntable means comprises a lower annular track member 18 secured to the foundation frame 16—17 by brackets 19 and supported above the plane of the foundation frame. The annular track member 18 has radial spokes or arms 20 which support a centrally positioned tubular hub member 21.

An upper annular track member 22 rests on the lower track member 18. The upper track member 22 is rigidly connected by radial spokes or arms 23 with a centrally positioned tubular hub 24. The tubular hub 24 fits rotatively within the hub 21 of the lower track member 18 and is provided with a radial flange 25 which rests upon said hub member 21. A plurality of brackets 26 are rigidly secured to the peripheral portion of the upper turntable track member and extend upwardly therefrom to provide means to which a turntable frame hereinafter described can be secured.

The upper track member 22 is adapted to be rotatively moved relative to the lower track member 18 by a lever arm 27. This lever arm 27 has a plate portion 28 which is secured to the tubular hub 24 of the upper track member 22 as by cap screws 29. A circular opening 30 is provided in the plate portion 28 to afford clearance for conduit members as hereinafter explained. The plate portion 28 holds the two annular track members in assembled relation.

The outer end portion of the lever arm 27 is connected by pivot means 31 with a piston rod 32 which extends through suitable packing means 33 into a hydraulic cylinder 34. The hydraulic cylinder assembly composed in part of piston rod 32 and cylinder 34 is double acting and can be used to rotatively move the upper turntable track member 22 in two directions as hereinafter explained.

Secured to the upper turntable track member 22, as by means of the brackets 26, is a rectangular turntable frame 35 composed of side channels and cross members. A rectangular base frame 36 also composed of side channels and cross members is movably supported from the turntable frame 35, as by rollers 37, Fig. 4, which are rotatively mounted on axle pins 38 of brackets 39. The brackets 39 are rigidly secured to the side channels of the base frame 36 and the rollers 37 run in the side channels of the turntable frame 35. At least two of the rollers 37 are provided in longitudinally spaced apart relation on each side of the base frame 36 to efficiently support said base frame for longitudinal movement relative to the turntable frame 35. A double acting hydraulic cylinder assembly 40, see Figs. 2, 3 and 4, has one end portion connected by pivot and bracket means 41 with the base frame 36, and the other end portion connected by pivot and bracket means 42 with the turntable frame 35. Suitable hydraulic connections are provided for the cylinder assembly 40, as hereinafter explained.

A rectangularly shaped swinging frame 43 is connected by horizontal pivot means 44 with an end portion of the base frame 36. The pivot means 44 can be a cross shaft supported in brackets 45 which are secured to the base frame 36. The side members of the swinging frame 43 preferably are parallel and of channel shaped cross section and are rigidly connected with each other so that they can be used as track members to slidably receive the side bars of an extension frame 46.

A double acting hydraulic cylinder assembly is provided for longitudinally moving the extension frame 46 relative to the swinging frame 43. This hydraulic cylinder assembly, Figs. 2 and 3, comprises in part a cylinder 47 connected by pivot and bracket means 48 with the inner or pivoted end portion of the swinging frame 43 and having a piston rod 49 which is connected as by bracket and pivot means 50 with the outer end portion of the extension frame 46. Sickle mechanism, as hereinafter explained, is pivotally connected with and carried by the outer end portion of the extension frame 46.

The means for angularly adjusting the swinging frame 43 and for supporting the same at any angle to which it is adjusted comprises an arcuate quadrant 51, Fig. 4, rigidly secured to the pivoted end portion of the swinging frame 43. A chain 52 extends over said quadrant and is secured thereto, as by bolt means 53. A piston rod 54, Fig. 1, is connected with the chain 52 and extends into a hydraulic cylinder 55, Fig. 1, which is secured, as by a pivot 56 and bracket means 57, to the base frame 36. Obviously retractile movement of the piston rod 54 into the cylinder 55 will angularly move the swinging frame 43 upwardly and lowering of this swinging frame by gravity will occur when the piston rod 54 is allowed to move outwardly as respects the cylinder 55.

*Cutter mechanism*

In a general way this sickle mechanism comprises a sickle bar 58 carrying the usual guard members 59 and a reciprocable sickle 60. An outer skid shoe 61 and an inner skid shoe 62 are provided on the sickle bar 58. Another skid shoe 63 is provided on a bracket 64 which is rigidly secured to the outer end portion of the extension frame 46. Another bracket 65 is also secured to the outer end portion of the extension frame 46 and a sickle driving shaft 66 is journaled in this bracket 65. A hydraulic motor 67 is connected by means including a coupling 68 with an end portion of the shaft 66 and a crank disc 69 is secured to another end portion of this shaft 66. A pitman 70 connects the crank disc 69 with the sickle for reciprocating said sickle when the shaft 66 is driven. The hydraulic motor 67 is secured by a bracket 71 to the extension frame 46. A bracket plate 72 has one end portion secured to the sickle bar 58 and the other end portion pivotally mounted for vertical swinging movement about an axis common to the axis of the sickle drive shaft 66. A diagonal truss member 73 has one end portion thereof secured to the bracket plate 72 adjacent the base of an upwardly extending post 72' which is rigid with the bracket plate 72 and the other end of truss member 73 is secured to the bracket 64 by pivot means 74. The pivot means 74 is aligned with the axis of the shaft 66. Another truss member 73' connects the upper end portion of the post 72' with the skid shoe 62 forwardly of the sickle 60. The devices just described connect the sickle bar 58 with the extension frame 46 in such a manner that the sickle bar can be swingably moved vertically about the axis of the sickle drive shaft 66.

The means for swingingly moving the sickle bar 58 vertically comprises a gear segment or quadrant 75, Fig. 1, secured to the bracket plate 72 and having a push and pull roller chain 76 operable thereon. One end portion of the roller chain 76 is connected with the quadrant 75 as by a bolt 77 and the other end portion of said roller chain 76 is connected with the end of a piston rod 78, Figs. 2, 7 and 8, which extends into a hydraulic cylinder 79.

The piston rod 78 is guided by guide members 80 which support the piston and the roller chain 76 and make it possible to use the roller chain for both push and pull purposes. An extension guide member 81 overhangs the quadrant 75 and further cooperates in guiding the roller chain 76. The end portion of the cylinder 79 which is shown at the left in Figs. 1, 2 and 8 is connected by pivot and bracket means 82 with the extension frame 46. The cylinder 79 and piston rod 78 and parts associated therewith provide a double acting hydraulic cylinder assembly for angularly moving the sickle bar 58 vertically and for holding said sickle bar in any desired adjusted position.

*Hydraulic means*

The means shown in the drawings for supplying hydraulic pressure to operate the hydraulic motor 67 and the several hydraulic cylinder assemblies comprises an internal combustion engine 83, Figs. 1, 2 and 4, supported on the base frame 36 and connected by shaft and flexible coupling means 84 with twin speed reducing gear means in a housing 85. Two independent hydraulic pumps 86 and 87 are connected with the reducing gear means in the housing 85, as by two shaft and flexible coupling devices, 88 and 89 respectively, Fig. 2. Preferably the transmission housing 85 and pumps 86 and 87 are mounted on a platform 90, Fig. 4, which is supported on cross channels 91 that rest on and are secured to the base frame 36. A reservoir or tank 92 for hydraulic fluid, such as oil, is provided. Preferably this reservoir 92 is supported above the pumps 86 and 87 and housing 85 by upright support members 93 which are rigid with the base frame 36. The pumps 86 and 87 have their intake ports connected with the reservoir 92, see Fig. 3, by conduits 94 and 95 respectively so that they receive their supply of hydraulic fluid from the reservoir 92.

The pump 86 is connected in the manner hereinafter explained with the sickle driving motor 67 and the pump 87 is connected by means hereinafter described with the several hydraulic cylinders 34, 40, 47, 55 and 79.

The hydraulic control means is in the form of a plurality of valves. This control means is designated generally by 128, Figs. 1, 2 and 3, and is mounted on the rear end portion of the truck and in the cab 13 where it is readily accessible to the driver, who controls and drives the truck. The frame means on which all of the hydraulically operated parts are carried is angularly movable through at least an angle of approximately ninety degrees relative to the truck frame. Consequently it has been found advantageous and desirable that all conduits passing between the control means 128 on the truck frame and the hydraulic devices on the frame which is supported by the turntable shall be passed through the open central portions or hubs of the turntable members 18 and 22. To support these conduits where they thus pass through the open center portions or hubs of the turntable members I preferably provide apparatus as best shown in Figs. 5 and 6. This apparatus comprises an upper disc 96 rotatably supported in a suitable annular groove between one or more plates 97 which are secured, as by cap screws 98, to the flange 25 of the upper turntable member 22 and a lower disc or plate 99 which is positioned below the hubs 21 and 24 of the turntable members 18 and 22 and is rigidly supported relative to the truck frame and lower turntable member, as by bracket means 100. The conduits pass vertically through the discs 96 and 99 and are positioned and supported thereby. The upper turntable member and frame means carried thereby are freely movable angularly relative to both of the discs 96 and 99 but these discs do not move rotatively relative to the truck frame.

Also because of relative angular and longitudinal movement between different parts of the hydraulic mechanism and conduits it is necessary to provide conduit sections of a flexible and extensible nature. One satisfactory way of accomplishing this, in most instances, is to interpose a length of heavy duty flexible hose in any conduit where relative movement between two parts is required. One instance of the use of a flexible hose 101 in a conduit is shown in Fig. 5. These pieces of hose are omitted in the diagrammatic showing in Fig. 3 but it will be understood that they are used where required and that suitable pipe and pipe fittings are used along with the flexible and extensible sections in forming the conduits. In the conduits which are connected with the sickle driving motor 67 I prefer to use two relatively telescopic non-flexible conduit members 102 and 103. This avoids the use of flexible conduits in a location where they might be in the way and subject to being damaged.

Figure 3:
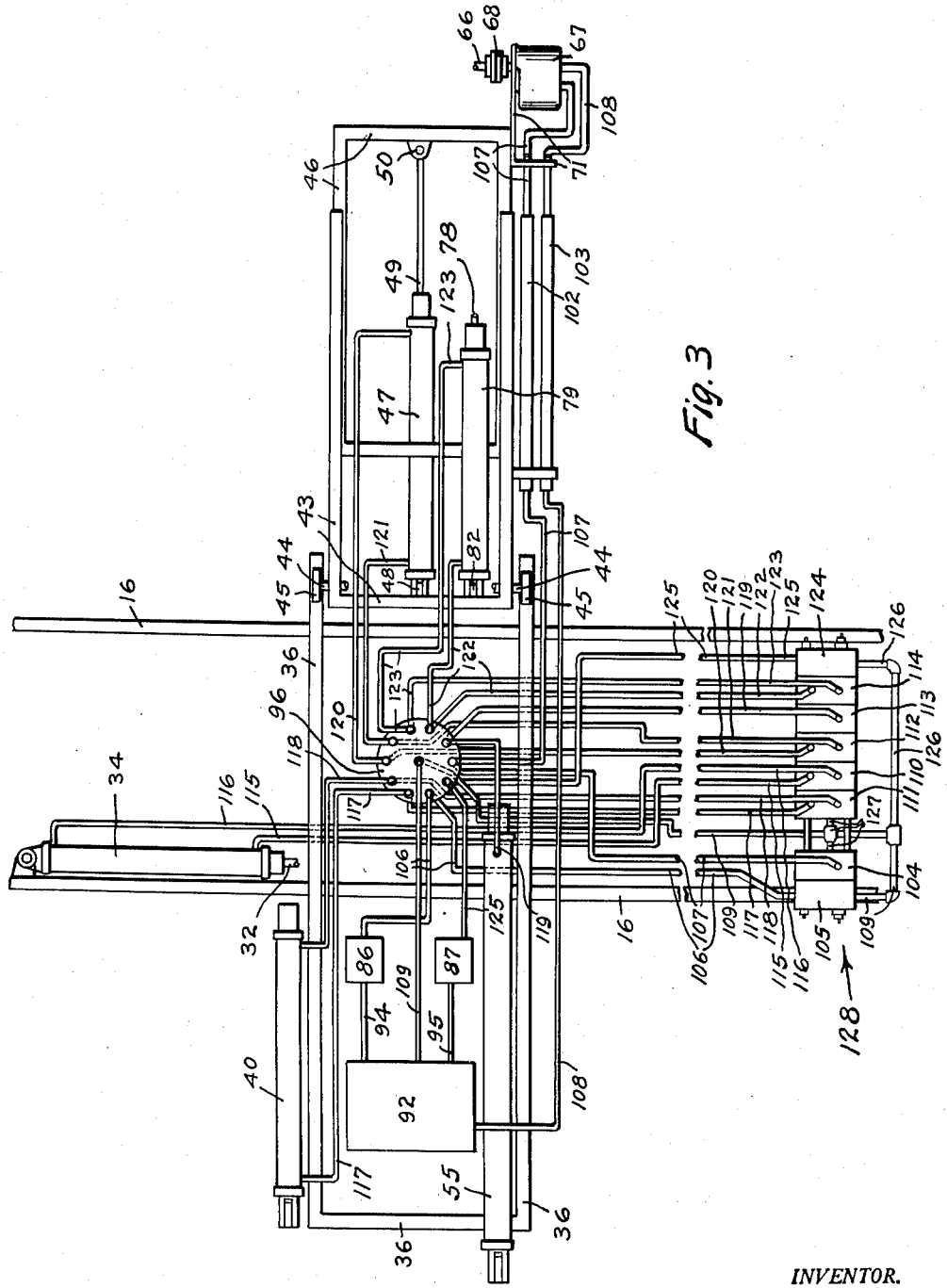
Fig. 3 is a somewhat diagrammatic fragmentary plan view, on a larger scale than Figs. 1 and 2, showing parts of the hydraulic operating and control mens for this mobile weed and brush cutter.

The control valves, shown diagrammatically in Fig. 3, are not shown in detail. In Fig. 3, 104 is a control valve for the sickle driving motor 67 and 105 is a pressure inlet and relief valve unit operating in conjunction with said control valve 104. A conduit 106 connects the pump 86 with the pressure inlet and relief valve unit 105. Another conduit 107 connects the control valve unit 104 with the sickle driving motor 67. The telescopic conduit member 102 forms part of the conduit 107. A return or exhaust conduit 108 connects the motor 67 directly with the reservoir 92. The telescopic conduit member 103 forms part of this conduit 108. A by-pass return conduit 109 is connected with the pressure inlet and relief valve 105 and returns to the reservoir 92.

A bank of hydraulic cylinder control valves 110, 111, 112, 113 and 114 are connected with the respective hydraulic cylinders 34, 40, 47, 55 and 79 as follows: Two conduits 115 and 116 connect the control valve 110 with the respective end portions of the double acting hydraulic cylinder 34; two conduits 117 and 118 connect the control valve 111 with the respective end portions of the double acting cylinder 40; two conduits 120 and 121 connect the control valve 112 with the respective end portions of the double acting cylinder 47; one conduit 119 connects the control valve 113 with the single acting cylinder 55; and two conduits 112 and 123 connect the control valve 114 with the double acting cylinder 79. A pressure inlet and relief valve unit 124 is connected with the bank of valves 110 and 114 inclusive and fluid under pressure is supplied to all of these valves 110 to 114 through the valve unit 124. A fluid pressure supply conduit 125 connects the pressure and relief valve unit 124 with the pump 87. Also a by-pass conduit 126 connects the valve unit 124 with the by-pass conduit 109 which leads back to the reservoir 92. The hydraulic cylinders 34, 40, 47, 55 and 79 all exhaust back through the respective valves 110, 111, 112, 113 and 114, which are connected by pipe and fitting means 127 with the by-pass conduit 109 which leads back to the reservoir 92. The several valve members 110 to 114 inclusive and 124 are all communicatively connected with each other so that they can thus exhaust by way of pipe and fitting means 127 and conduit 109. Also these valve units are constructed so that fluid pressure from the pressure inlet and relief valve unit 124 is always available to any of the control valves 110 to 114 inclusive.

Sickle motor control valve 104 is also connected, through pipe and fitting means 127 with the return pipe 109. This valve 104 has one position in which fluid will be caused to flow through pipe 107 to the sickle driving motor 67 and another position in which fluid entering through valve 105 will be allowed to flow back to the reservoir 92 through pipe and fitting means 127 and conduit 109. This makes possible intermittent operation of the motor 87 while the pump 86 operates continuously.

Each valve 111 to 114 inclusive is constructed so that it can be used to adjust the hydraulic cylinder mechanism which is connected therewith to any desired position and hold said cylinder in the adjusted position. Each inlet and relief valve unit 105 and 124 is constructed so that it will by-pass fluid back to the tank 92 when the pressure of fluid entering the valve equals or exceeds a predetermined maximum pressure limit.

The hydraulic cylinder 34 and the control valve 110 are both attached directly to the truck frame and are not subjected to angular movement relative to each other. For this reason it is not necessary to pass the conduits 115 and 116 through the center or hub portions of the turntable members 18 and 22. Also the return or exhaust conduit 108 from the sickle driving motor 67 is not passed through the hub portions of the turntable members. All of the other conduits are passed through the hub portions of the turntable members.

In the apparatus shown in Fig. 9 all of the frame and cutter mechanism parts and the hydraulic mechanism and conduits and valves therefor are similar to those shown in Figs. 1 to 8 and are similarly numbered. The difference between the apparatus shown in Fig. 9 and that shown in the preceding figures resides in the fact that in Fig. 9 the control valves are carried on the turntable frame 36 and these control valves are adapted to be operated by flexible push-pull cables which extend through the central portion of the turntable and to the control station in the cab 13 from which the truck is driven. This provides for one-man control of the truck and the cutter mechanism.

The push-pull cables can be of the usual well known form in which a wire or cable is guided for longitudinal movement in a flexible tubular member. Fig. 9 shows diagrammatically a plurality of push-pull control cables or wires 129, 130, 131, 132, 133 and 134 connected with the respective valves 104, 110, 111, 112, 113, and 114 and extending to and through the central portion, such as the plate 96, of the turntable and thence to control members 135 in the cab 13 of the truck. If desired levers can be used for operating the push-pull cables and for connecting these push-pull cables with the valves.

The use of the push-pull cables for operating the control valves makes it possible to mount the control valves on the frame which is carried by the turntable and this simplifies the system of hydraulic conduits.

In the operation of this weed and brush cutter the driver in the cab 13 has full control of the weed and brush cutter mechanism. When the machine is to be moved from place to place the weed and brush cutter mechanism is moved into a position longitudinally of the truck with the sickle bar 58 upright and positioned near the cab 13 as shown in Fig. 1. With the parts in this position it is possible to make fast time on the road. When the machine is to be used for cutting purposes the cuttting mechanism is turned crosswise of the truck frame and the sickle bar and frames supporting the same are adjusted to any desired cutting position. The weed and brush cutting mechanism is in front of the operator and fully visible at all times. The control devices are all readily accessible from the driver's seat and one operator can easily drive the truck and control the cutting mechanism.

The foregoing description and accompanying drawings clearly disclose a preferred embodiment of this invention but it will be understood that this disclosure is merely illustrative and that changes can be made within the scope and spirit of the following claims.

I claim:

1. In control means for a mobile weed and brush cutter which is mounted on an automotive truck having a frame and having driving control means for the truck positioned on the rear end portion of the truck frame and having a horizontal turntable rotatively supported on the truck frame forwardly of said driving control means and in spaced relation therefrom and having extensible frame means carried by said turntable and movable by rotation of said turntable between a position substantially crosswise of the truck frame and a position substantially parallel to the truck frame and having cutter mechanism carried by said extensible frame means; actuating means for said cutter mechanism carried by said extensible frame; and control means for said actuating means positioned adjacent said driving control means providing for one man operation of said weed and brush cutter.

2. Control means for a mobile weed and brush cutter which is mounted on an automotive truck having a truck frame and has turntable means on said truck frame provided with an open hub portion and has cutter mechanism supported by said turntable means comprising a control station on the truck; hydraulic means carried by the turntable for operating the cutter mechanism; and hydraulic conduits extending between said hydraulic operating means and said control station and through the open hub portion of said turntable means.

3. Control means for a mobile weed and brush cutter which includes an automotive truck driving control means for the truck positioned on the rear end portion of the truck a horizontal turntable supported on the truck forwardly of said driving control means and cutter mechanism carried by said turntable; comprising hydraulic means carried on said turntable for operating said cutter mechanism; valve means carried on the truck and positioned adjacent said driving control means and controlling said hydraulic means; and conduits connecting said hydraulic means and said valve means, said conduits passing through the hub portion of said turntable.

4. Control means for a mobile weed and brush cutter which includes an automotive truck having a truck frame, driving control means for the truck positioned on the rear end portion of the truck frame, a foundation frame removably secured to said truck frame, a lower circular turntable member fixedly secured to said foundation frame, said lower turntable member having a relatively large tubular hub portion, an upper turntable member having a tubular hub portion rotatively supported in the hub portion of said lower turntable member, extensible frame means carried by said upper turntable member and cutter mechanism mounted on said extensible frame means; comprising hydraulic devices carried on said extensible frame means for operating said cutter mechanism; control valves for said hydraulic devices, said control valves being positioned adjacent said driving control means for control of said driving control means and said valves by one operator; and conduits connecting said hydraulic devices and said valves, said conduits extending through the hub portion of said turntable.

5. Control means for a mobile weed and brush cutter which includes an automotive truck having a truck frame, driving control means for the truck positioned on the rear end portion of the truck frame, a foundation frame removably secured to said truck frame, a lower circular turntable member fixedly secured to said foundation frame, said lower turntable member having a relatively large tubular hub portion, an upper turntable member having a tubular hub portion rotatively supported in the hub portion of said lower turntable member, a disc positioned above and rotatively supported by said upper turntable member and extending across the open hub portion of said upper turntable member, another disc fixedly supported below said lower turntable member and extending across the open hub portion thereof, extensible frame means carried by said upper turntable member and cutter mechanism mounted on said extensible frame means; comprising hydraulic devices carried on said extensible frame means and adapted to operate said cutter mechanism; control valves for said hydraulic devices, said control valves being positioned adjacent said driving control means, whereby said valves can be operated by the driver of the truck; and conduits communicatively connecting said hydraulic devices and said valves, said conduits extending through the tubular hub portions of said turntable members and through said discs and being supported by said discs.

6. Control means for mobile weed and brush cutter mechanism which is carried on a horizontal turntable rotatively mounted on the frame of an automotive truck, which truck has driving control means positioned on the rear end portion thereof and to the rear of said turntable, comprising hydraulic means carried by the turntable for operating the cutter mechanism; control valves for said hydraulic means supported on the turntable; and flexible push-pull control valve operating members connected with said control valves and extending to the driving control station for operation of the flexible push-pull valve operating members from the truck driving control station.

7. Control means for mobile weed and brush cutter mechanism which is carried on a horizontal turntable rotatively mounted on the frame of an automotive truck, which truck has driving control means positioned on the rear end portion thereof and to the rear of said turntable, comprising hydraulic means carried on said turntable for operating said cutter mechanism; control valve means for said hydraulic means supported on the turntable; and flexible push-pull valve operating members connected with said control valve means and extending through the central portion of said turntable and to a position adjacent said truck driving control means for one man operation of said truck and said cutter mechanism.

EARL W. HOLMES.

REFERENCES CITED

The following references are of record in the file of this patent:

UNITED STATES PATENTS

| Number | Name | Date |
| --- | --- | --- |
| 1,568,163 | Johnston et al. | Jan. 5, 1926 |
| 1,953,394 | Clapper | Apr. 3, 1934 |
| 1,958,405 | Anthony et al. | May 15, 1934 |
| 2,304,421 | Rogers | Dec. 8, 1942 |